(12) United States Patent
Mehran et al.

(10) Patent No.: US 11,876,572 B2
(45) Date of Patent: Jan. 16, 2024

(54) WIRELESS TELECOMMUNICATIONS NETWORK

(71) Applicant: British Telecommunications Public Limited Company, London (GB)

(72) Inventors: Farhad Mehran, London (GB); Richard Mackenzie, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 17/759,027

(22) PCT Filed: Dec. 9, 2020

(86) PCT No.: PCT/EP2020/085375
§ 371 (c)(1),
(2) Date: Jul. 18, 2022

(87) PCT Pub. No.: WO2021/144077
PCT Pub. Date: Jul. 22, 2021

(65) Prior Publication Data
US 2023/0059993 A1 Feb. 23, 2023

(30) Foreign Application Priority Data

Jan. 17, 2020 (EP) .................................... 20152421
Jan. 17, 2020 (GB) .................................... 2000707

(51) Int. Cl.
*H04B 17/382* (2015.01)
*H04B 17/391* (2015.01)
*H04L 5/00* (2006.01)

(52) U.S. Cl.
CPC ....... *H04B 17/382* (2015.01); *H04B 17/3912* (2015.01); *H04L 5/0073* (2013.01)

(58) Field of Classification Search
CPC .. H04B 17/382; H04B 17/3912; H04L 5/0073
See application file for complete search history.

(56) References Cited

U.S. PATENT DOCUMENTS

| 944,907 A | 12/1909 | Powers |
| 9,344,907 B1 | 5/2016 | Kravets |

(Continued)

FOREIGN PATENT DOCUMENTS

| CN | 101267643 B | 7/2011 |
| CN | 102752790 A | 10/2012 |

(Continued)

OTHER PUBLICATIONS

Combined Search and Examination Report under Sections 17 and 18(3) for Great Britain Application No. 2000707.6, dated Jul. 1, 2020, 7 pages.

(Continued)

*Primary Examiner* — Natasha W Cosme
(74) *Attorney, Agent, or Firm* — Pranger Law PC

(57) ABSTRACT

A method of determining performance of a Radio Access Network (RAN) of a telecommunications network is disclosed in which the RAN covers an area that is divided into a plurality of unit cells. The method includes receiving a measured performance value of the RAN within at least one unit cell of the plurality of unit cells; receiving a simulated performance value of the RAN within each of the plurality of unit cells; identifying a unit cell that is associated with both a measured performance value and a simulated performance value; calculating, for the identified unit cell, a difference function between the simulated performance value and the measured performance value; and applying the difference function to the simulated performance value of at least one adjacent unit cell to the identified unit cell to determine a modified simulated performance value for the at least one adjacent unit cell.

8 Claims, 9 Drawing Sheets

(56) References Cited

U.S. PATENT DOCUMENTS

| | | |
|---|---|---|
| 2004/0116111 A1 | 6/2004 | Saunders |
| 2007/0010204 A1 | 1/2007 | Hubner et al. |
| 2009/0215443 A1 | 8/2009 | Dickey et al. |
| 2010/0278057 A1 | 11/2010 | Robinson et al. |
| 2020/0008078 A1 | 1/2020 | Andersson et al. |

FOREIGN PATENT DOCUMENTS

| | | |
|---|---|---|
| CN | 102487516 B | 4/2014 |
| CN | 109996251 A | 7/2019 |
| EP | 3515099 A1 | 7/2019 |

OTHER PUBLICATIONS

Extended European Search Report for Application No. 120152421.2, dated Jul. 8, 2020, 8 pages.
International Preliminary Report on Patentability for Application No. PCT/EP2020/085375, dated Feb. 7, 2022, 15 pages.
International Search Report and Written Opinion for Application No. PCT/EP2020/085375, dated Jan. 14, 2021, 14 pages.
Sharawi M.S., "RF Planning and Optimization of LTE Networks", Aug. 2010, Chapter: 11, Publisher: CRC Press, Editors: L. Song and J. Shen, 37 pages.

|   | A | B | C | D | E | F | G | H | I | J |
|---|---|---|---|---|---|---|---|---|---|---|
| 1 | D1 | D1 | D1 | ☆ | D1 | D1 | D1<br>I2 | I2 | I2 | I2 |
| 2 | D1 | D1 | D1 | D1 | D1 | D1 | D1<br>I2<br>H4 | I2<br>H4 | ☆ |  |
| 3 | D1 | D1 | D1 | D1 | D1 | D1 | H4 | H4 | H4 |  |
| 4 |  |  | D1 | D1 | D1 |  | H4 | ☆ | H4 |  |
| 5 |  |  |  |  |  |  | H4 | H4 | H4 |  |
| 6 |  | BS |  | E7 | E7 | E7 | H4 | H4<br>J10 | H4<br>J10 | J10 |
| 7 |  |  | E7 | E7 | ☆ | E7 | E7 | E7<br>J10 | J10 | J10 |
| 8 | C10 | C10 | C10<br>E7 | C10<br>E7 | E7 | E7 | E7<br>J10 | E7<br>J10 | J10 | J10 |
| 9 | C10 | C10 | C10 | C10 |  |  | J10 | J10 | J10 | J10 |
| 10 | C10 | C10 | ☆ | C10 |  |  | J10 | J10 | J10 | ☆ |

Figure 5

WIRELESS TELECOMMUNICATIONS NETWORK

PRIORITY CLAIM

The present application is a National Phase entry of PCT Application No. PCT/EP2020/085375, filed Dec. 9, 2020, which claims priority from EP Patent Application No. 20152421.2, filed Jan. 17, 2020 and GB Patent Application No. 2000707.6, filed Jan. 17, 2020, each of which is hereby fully incorporated herein by reference.

TECHNICAL FIELD

The present disclosure relates to a wireless telecommunications network. More specifically, it relates to a method of determining performance of a wireless transmitter in a wireless telecommunications network.

BACKGROUND

A wireless telecommunications network, such as a cellular telecommunications network, includes a plurality of transceivers positioned about a geographical area. These transceivers are often called Access Points (APs) and each have their own coverage area defined as the geographic area within which the AP provides service (i.e. based on the maximum distance of transmissions from the AP). It is beneficial for a network operator to determine the performance of each AP, so that each existing or new AP may be configured to improve overall performance in the network.

One method of determining performance of an AP in a wireless telecommunications network is by conducting a Field Drive Test (FDT). A FDT is performed by taking performance measurements (e.g. signal strength) of one or more APs. At the time of the FDT, each AP is using a particular configuration profile, in which each configuration parameter (e.g. antenna tilt, gain, radiation pattern, mechanical azimuth, height, location, etc.) takes a value from a set of possible values for that configuration parameter. As performance varies based on the particular configuration profile in use by the AP (and potentially neighboring APs where there are overlapping coverage areas), the results of the FDT are only valid for the particular configuration profile in use at the time of the FDT. FDTs therefore give very accurate measurements of the performance of the one or more APs, but suffer from a high resource requirement to measure all APs in all configurations at the same time (which would be required in order to determine the optimal configuration profile for each AP).

Another method of determining performance of an AP in a wireless telecommunications network is by utilizing a computational simulation tool, which predicts the performance of an AP over a coverage area for a given configuration profile. The network operator may substantially reduce their planning costs by utilizing these tools and simulating the performance of each AP using each configuration profile. However, the simulated values for each performance measurement may differ from a real measurement.

SUMMARY

According to a first aspect of the disclosure, there is provided a method of determining performance of a Radio Access Network, RAN, of a telecommunications network, the radio access network covering an area, and said area being divided into a plurality of unit cells, the method comprising: receiving a measured performance value of the RAN within at least one unit cell of the plurality of unit cells; receiving a simulated performance value of the RAN within each of the plurality of unit cells; identifying a unit cell that is associated with both a measured performance value and a simulated performance value; for said identified unit cell, calculating a difference function between the simulated performance value for the identified unit cell and the measured performance value for the identified unit cell; applying said difference function to the simulated performance value of at least one unit cell that is adjacent to the identified unit cell, thereby resulting in a modified simulated performance value for the adjacent unit cell.

In some embodiments, each unit cell that is associated with both a measured performance value and a simulated performance value may be identified, and a difference function may be calculated for each such identified unit cell, and the method may further comprise: applying said difference function to the simulated performance value of at least one unit cell that is adjacent to each such identified unit cell, thereby resulting in a modified simulated performance value for the adjacent unit cell.

The difference function may be applied to a simulated performance value of at least one unit cell that is adjacent to the adjacent unit cell, thereby resulting in a modified simulated performance value for said adjacent unit cell, so as to form a contiguous region of unit cells around each identified unit cell.

The method may be performed for a plurality of configuration profiles for the RAN, thereby resulting in a first modified simulated performance value for a first adjacent unit cell for a first configuration profile of the plurality of configuration profiles, and further resulting in a second modified simulated performance value for a second adjacent unit cell for a second configuration profile of the plurality of configuration profiles.

The method may further comprise: configuring the RAN based on the modified simulated performance value for the adjacent unit cell.

In some embodiments, configuring the RAN may be based on the first and second modified simulated performance values.

According to a second aspect of the disclosure, there is provided a computer program comprising instructions which, when the program is executed by a computer system, cause the computer system to carry out the method of the first aspect of the disclosure. The computer program may be stored on a computer readable carrier medium.

According to a third aspect of the disclosure, there is provided a system for a telecommunications network comprising one or more nodes configured to carry out the method of the first aspect of the disclosure.

BRIEF DESCRIPTION OF THE DRAWINGS

In order that the present disclosure may be better understood, embodiments thereof will now be described, by way of example only, with reference to the accompanying drawings in which:

FIG. 2 is a diagram illustrating a geographical area within the wireless telecommunications network of FIG. 1.

FIG. 3 is a diagram of the geographical area of FIG. 2, illustrating measurement locations.

FIG. 5 is a diagram of the geographical area of FIG. 2, illustrating a plurality of clusters around a plurality of measurement locations.

DETAILED DESCRIPTION

Figure 1:
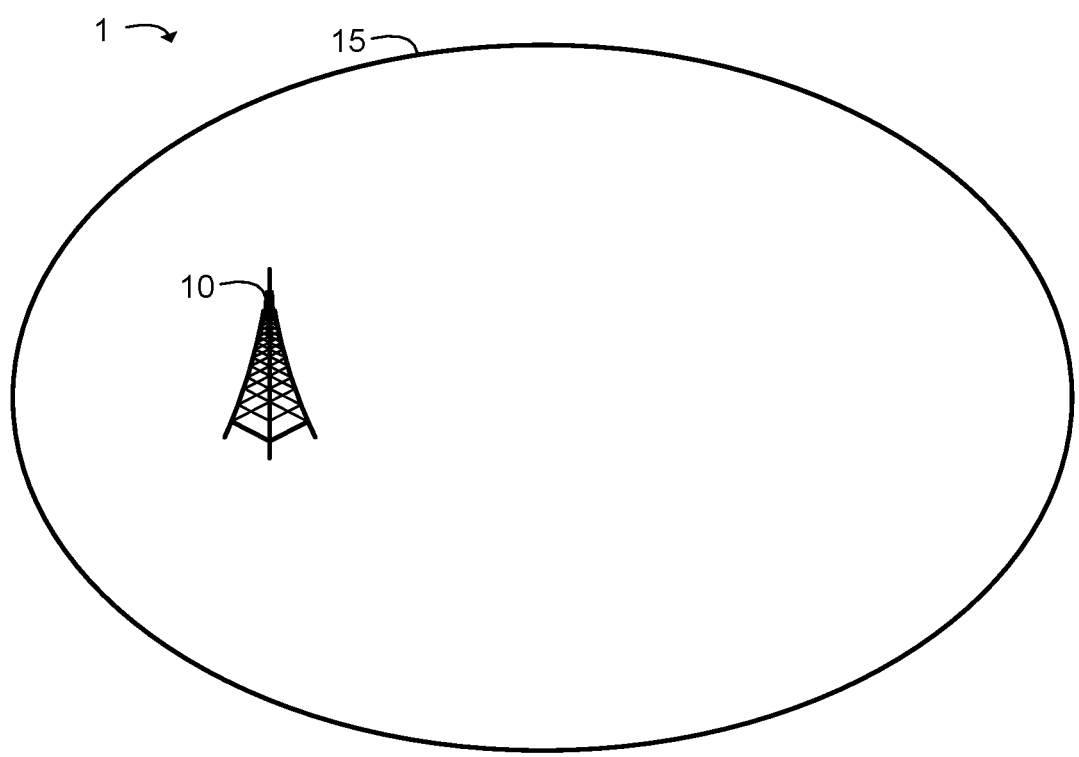
FIG. 1 is a schematic diagram of a wireless telecommunications network of a first embodiment of the present disclosure.

A first embodiment of a wireless telecommunications network of the present disclosure will now be described with reference to FIG. 1. In this embodiment, the wireless telecommunications network is a cellular telecommunications network 1 having a base station 10, wherein the base station 10 has an associated coverage area 15. The base station 10 is configured to transmit wireless signals about the coverage area 15 according to a particular cellular telecommunications protocol (e.g. Long Term Evolution, LTE).

In this embodiment, the base station 10 includes a first, second and third transceiver, wherein each transceiver uses one of a plurality of configuration profiles. A configuration profile specifies a value for each of a plurality of configuration parameters (e.g. antenna tilt, gain, mechanical azimuth, height, location, etc.), wherein the value for any one configuration parameter is one of a range of possible (discrete or continuous) values for that configuration parameter.

Figure 2:
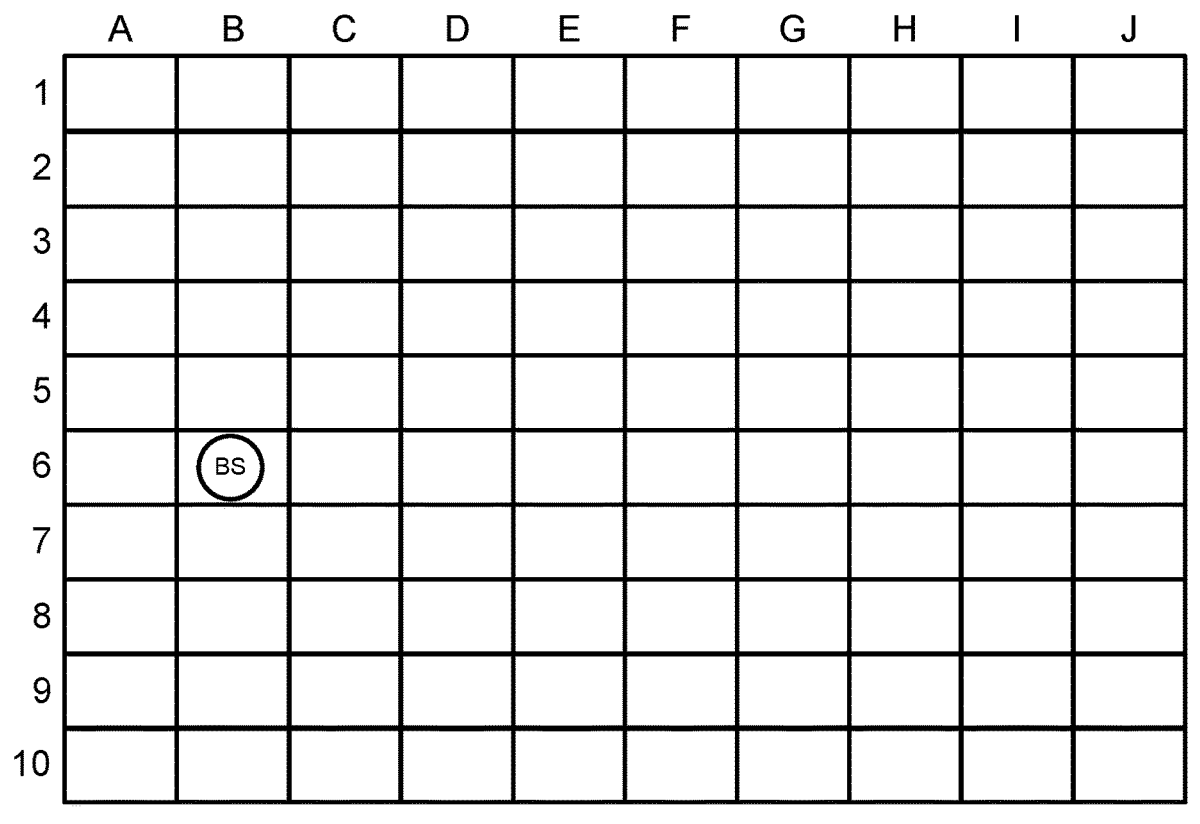

An embodiment of a method for identifying a configuration profile for each of the first, second and third transceivers of the base station 10 will now be described. In the following embodiment, there are nine possible configuration profiles which the first, second and third transceiver may use, without duplication. This embodiment includes a first and second sub-process, and the first sub-process is shown in FIGS. 2 to 6. FIG. 2 is a diagram representing a geographical area of interest that is within the coverage area 15 of the base station 10. The geographical area is divided into an array of unit cells. A rectangular geographical area is illustrated in FIG. 2 for ease of explanation, but geographical areas of any shape may be divided into an array of unit cells for the purposes of this embodiment. The base station is positioned in cell B6 (represented by a circle in the unit cell).

Figure 6:
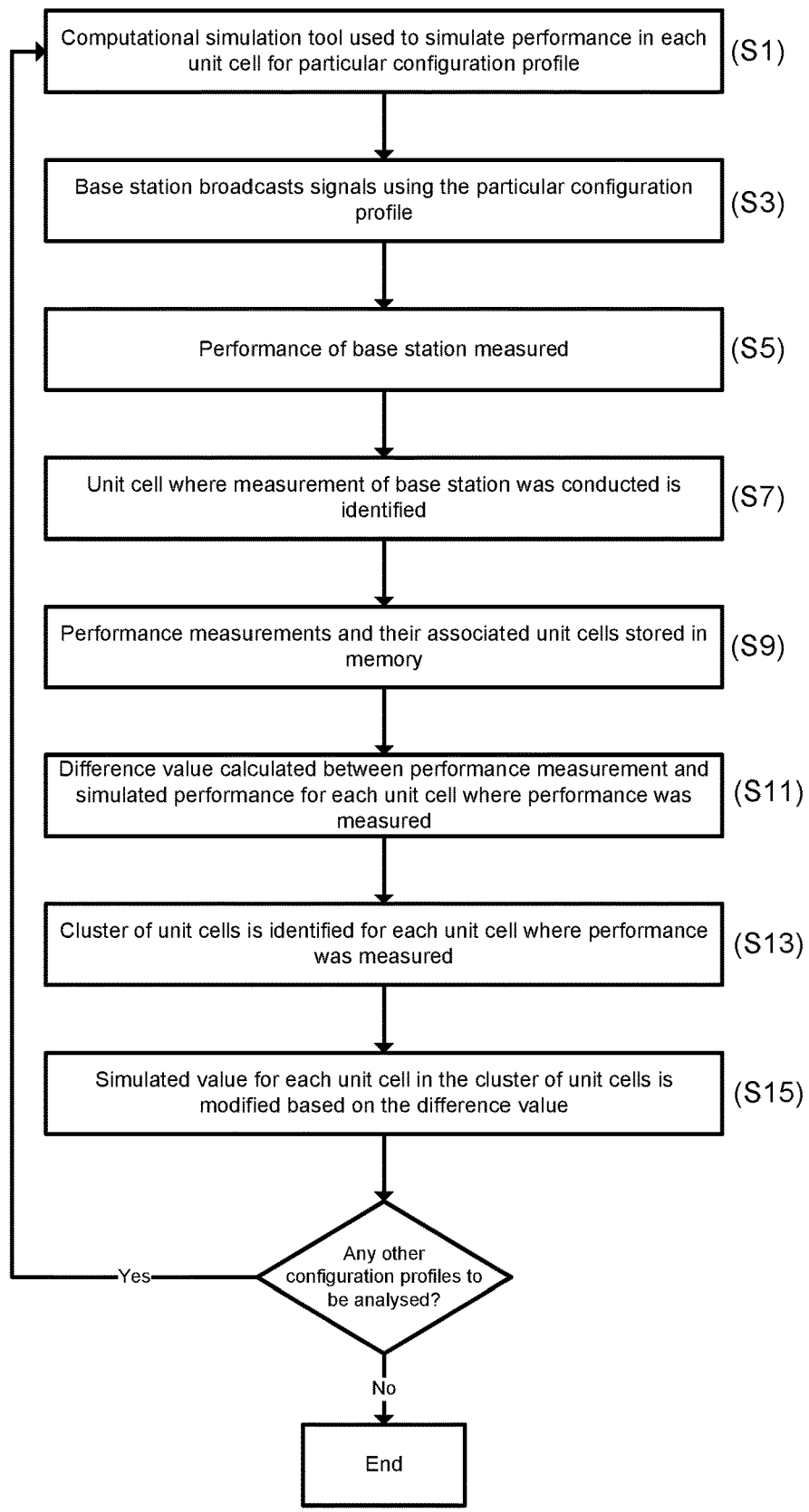
FIG. 6 is a flow diagram illustrating a first sub-process of an embodiment of a method of the present disclosure.

In a first step (step S1) of this iterative method as illustrated in the flow diagram of FIG. 6, a computational simulation tool is used (e.g. Forsk Atoll) to predict a value for a performance parameter (e.g. Reference Signal Received Power (RSRP)) in each unit cell of the geographical area when using the first configuration profile of the nine possible configuration profiles. These simulated values for each unit cell are stored in memory.

Figure 3:
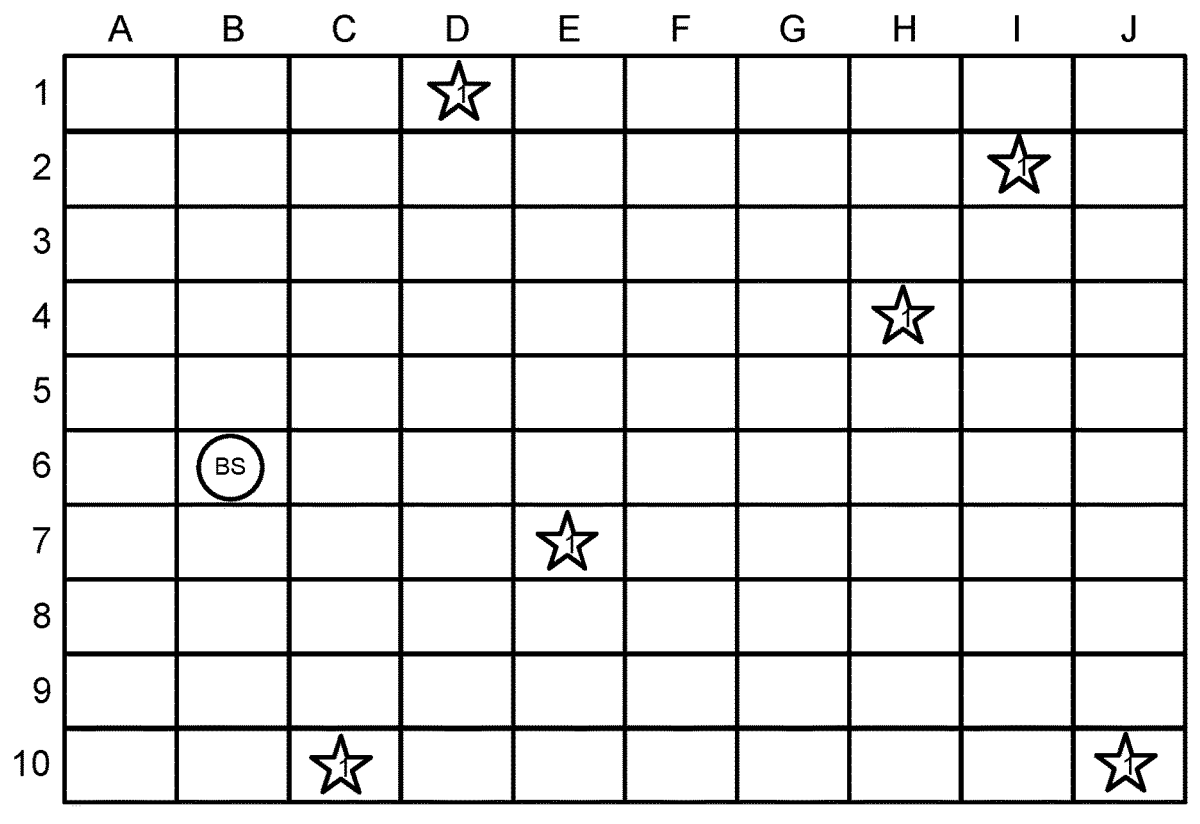

In step S3, the base station 10 utilizes its first transceiver only to broadcast signals using the first configuration profile. In step S5, a Field Drive Test (FDT) is conducted (e.g. using a Rohde & Schwarz signal and spectrum analyzer) to determine performance measurements (e.g. of RSRP) for the base station 10 when utilizing the first configuration profile. These measurements also include location data indicating the geographical location where the FDT was conducted. In step S7, the unit cell of the geographical area which includes the location of each respective FDT is identified. In step S9, the performance measurements and their associated unit cell identities are stored in memory. An example of a FDT comprising six separate performance measurements being conducted about the geographical area are illustrated in FIG. 3.

In step S11, a difference value is calculated between 1) the performance measurement within a unit cell where an FDT was conducted and 2) the simulated value for that unit cell. In this example, a difference value is calculated for the six unit cells where an FDT was conducted, i.e. D1, I2, H4, E7, C10 and J10.

Figure 4:
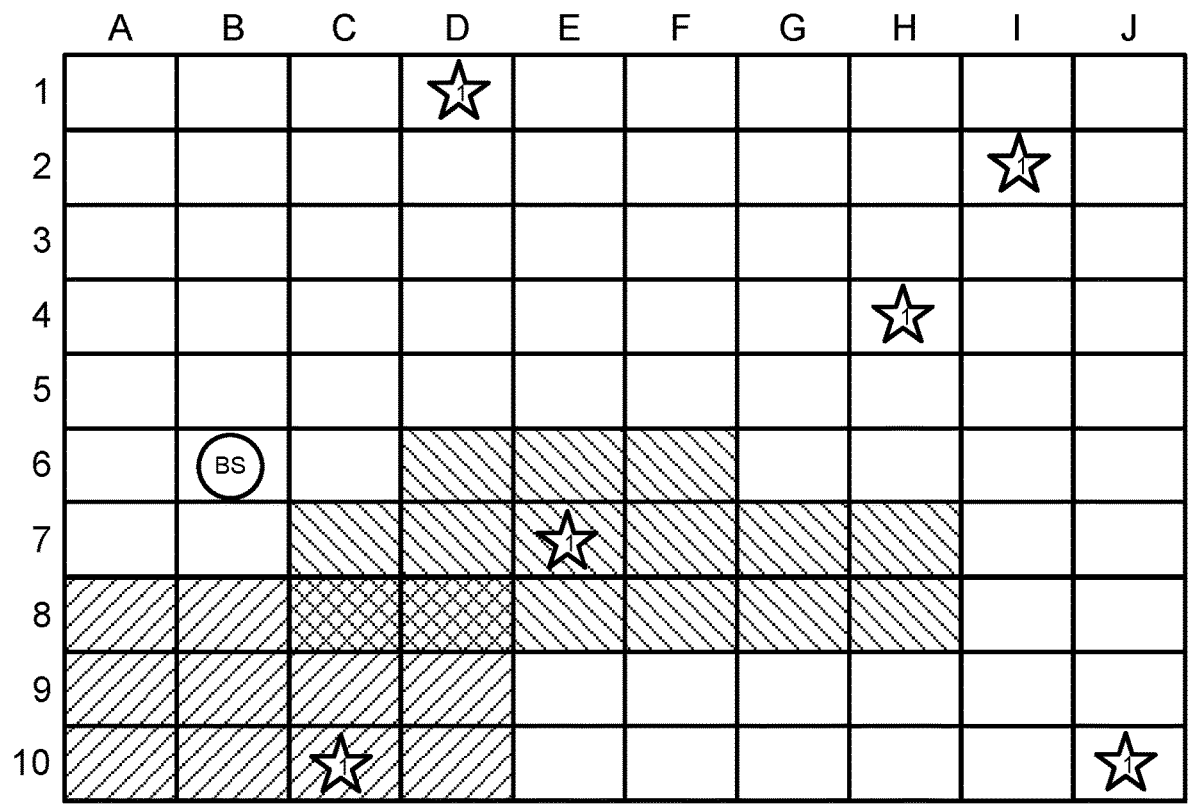
FIG. 4 is a diagram of the geographical area of FIG. 2, illustrating a first and second cluster of cells around two measurement locations.

In step S13, a cluster of unit cells is identified for each unit cell where an FDT was conducted, in which the cluster of unit cells includes the unit cell where the FDT was conducted and forms a contiguous area of unit cells each having a simulated value that is within a deviation threshold of the simulated value of the unit cell where the FDT was conducted. FIG. 4 illustrates a first cluster of unit cells identified as being within the deviation threshold of the unit cell C10, and a second cluster of unit cells identified as being within the deviation threshold of unit cell E7. It can be seen that there are two unit cells (C8 and D8) that are members of both the first and second clusters of cells.

In step S15, the simulated RSRP for each unit cell within a cluster of unit cells is normalized by addition of the simulated RSRP and the difference value of the cluster of unit cells the unit cell is a member of. If the unit cell is a member of a plurality of clusters, then the difference value is an average of the difference values for all clusters the unit cell is a member of (for example, the difference value for unit cells C8 and D8 would be the average of the difference value for the first and second clusters of unit cells).

As shown in FIG. 5, following these steps, the coverage area has been divided into unit cells in which each unit cell comprises either, 1) a measured value (represented by a star), 2) a normalized simulated value based on both the simulated value and the difference value computed for one or more clusters of unit cells that the unit cell is a member of (represented by text identifying the unit cell of a cluster where the FDT was conducted), or 3) the simulated value where the unit cell is not a member of a cluster (represented by a blank unit cell). These values (the measured, normalized simulated, or simulated) values for each unit cell are stored in memory.

A first iteration of the first sub-process is now complete so that values for each unit cell for the first configuration profile of the nine configuration profiles have been computed and stored in memory. The sub-process then loops back to step S1 and all steps are repeated for a second of the nine configuration profiles. In summary, simulated values for each unit cell when using the second configuration profile are computed using a computational simulation tool, the base station utilizes its first transceiver only to broadcast signals using the second configuration profile, an FDT is conducted, a difference value is computed between each FDT measurement and the corresponding simulated value, a cluster of unit cells is identified for each unit cell where each FDT measurement was conducted, and normalized simulated values for each unit cell are determined. The measured, normalized simulated or simulated values for the performance parameter for the second configuration profile for each unit cell are stored in memory.

The method is similarly repeated for all nine configuration profiles, so that measured, normalized simulated or simulated values for the performance parameter for each configuration profile for each unit cell are stored in memory. The first sub-process is then complete and the second sub-process is performed on this data to identify a combination of three configuration profiles to use for the first, second and third transmitter. As the data includes normalized simulated values, this calculation combines the accuracy of real world measurement data from FDTs with the simplicity of computational simulation tools. In other words, a method utilizing these normalized simulated values may identify a combination of configuration profiles which is more accurate than a method based solely on computational simulation tools, but uses fewer resources than a method based solely on FDTs. The second sub-process of determining a combination of configuration profiles for the base station's transmitters will now be described with reference to FIGS. 7 to 11. This second sub-process is performed iteratively to analyses each combination of configuration profiles of the nine configuration profiles.

In a first step (step S21) of a first iteration of the second sub-process (illustrated by the flow diagram of FIG. 11), a combination of configuration profiles is identified for analysis and the data from the first sub-process for each configuration profile of this identified combination is retrieved. In this example, the combination is the first, second and third configuration profile, and so the data of the first, second and third configuration profiles is retrieved. In step S23, the data for one configuration profile of the three configuration profiles of the identified combination is selected as the reference data. This selection is based on a determination of the configuration profile with the highest count of measured values (and therefore the highest count of clusters of unit cells). In this example, the first configuration profile is selected.

Figure 7:
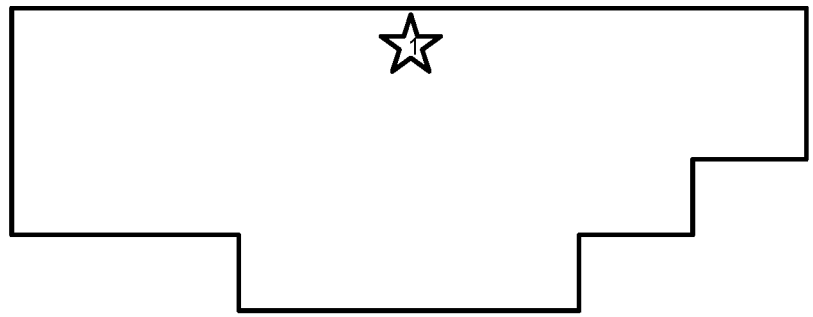
FIG. 7 is a diagram illustrating a region defined by a cluster of cells around a first measurement location of a first configuration profile.

As noted above, the data for the first configuration profile includes one or more clusters of unit cells. A first cluster of unit cells in the data for the first configuration profile is then analyzed to identify the configuration profile that has the best performance for the geographical region defined by that first cluster (step S25). The first cluster is illustrated in FIG. 7, showing a boundary of the geographical region defined by the first cluster of unit cells surrounding the measured value for unit cell D1. The data for this measured value is analyzed together with the data for the measured, normalized simulated or simulated values of the performance parameter for the corresponding unit cells for the second and third configuration profiles (that is, the unit cells corresponding to the same geographical region of the first cluster of unit cells) to determine whether the first, second or third configuration profile has the best performance.

Figure 8:
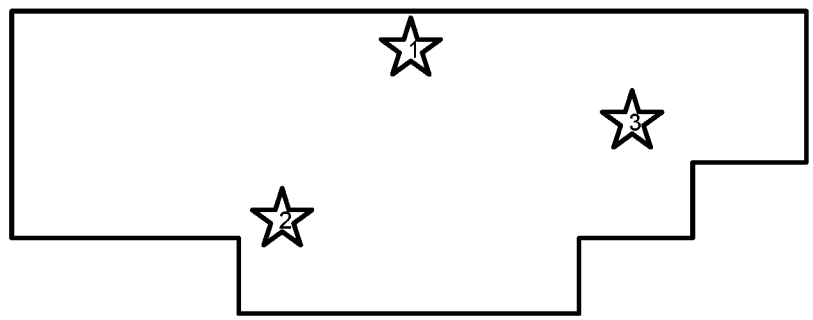
FIG. 8 is a diagram illustrating the region of FIG. 7, showing the measurement locations of a first, second and third configuration profile.

This analysis may be via one of several techniques. A first example technique is illustrated in FIG. 8, in which the boundary of the geographical region defined by the first cluster of unit cells for the first configuration profile is shown and the data for the second and third configuration profiles includes measured values of the performance parameter in corresponding unit cells. These values may then be analyzed to determine whether the first, second or third configuration profile has the best performance for that performance parameter.

Figure 9:
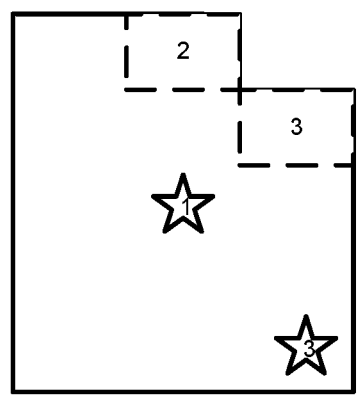
FIG. 9 is a diagram illustrating a region defined by a cluster of cells around a second measurement location of the first configuration profile, showing the measurement locations of a first and third configuration profile and normalized predicted values of a second and third configuration profile.

A second example technique is illustrated in FIG. 9, which shows the boundary for a geographical region defined by a second cluster of unit cells for the first configuration profile (the cluster surrounding the measured value for unit cell H4). In this scenario, the data for the second and third configuration profiles includes normalized simulated values of the second configuration profile and both measured and normalized simulated values of the third configuration profile. As the measured value is more accurate than the normalized simulated values, then the measured values for the first and third configuration profiles and the normalized simulated values for the second configuration profile are analyzed to determine the best performer for that performance parameter in the second cluster of unit cells (in other words, the normalized simulated values for the third configuration profile are disregarded).

Step S25 is performed for each cluster of unit cells in the data for the first configuration profile so that the best performing configuration profile for each cluster in the data of the first configuration profile is determined. It is then determined whether or not the data for the second and third configuration profiles (i.e. the configuration profiles that were not selected as the reference) includes measured values that were not considered during the analysis of the first configuration profile (that is, measured values in the data for the second and third configuration profile that were associated with a unit cell that did not correspond with a unit cell of any of the cluster of unit cells for the first configuration profile). If not, then the method proceeds to step S27 (described below). If more than one configuration profile includes unused measured values, then one of these configuration profiles is selected as a reference by determining which configuration profile has the highest count of measured values. If only one configuration profile includes one or more unused measured values, then that configuration profile is selected as the reference.

The method then loops back to step S25 so that each cluster of unit cells for an unused measured value in the data for the reference configuration profile is analyzed to identify the configuration profile that has the best performance for the geographical region defined by each cluster. Once all clusters of unit cells for unused measured values for the reference configuration profile have been analyzed, then step S25 is repeated for unused measured values for a configuration profile having the next highest count of measured values. Once all measured values for all configuration profiles of the combination have been considered, then the method proceeds to step S27.

In step S27, a probability density function of values is then recorded illustrating the variability of the performance parameter using the measured, normalized simulated or simulated value for each unit cell for the combination of configuration profiles. For example, if the data for the first configuration profile includes two clusters, and it is determined that the second configuration profile is the best performer for the first cluster and the third configuration profile is the best performer for the second cluster, then the measured, normalized simulated or simulated value for each unit cell corresponding to the first cluster for the second configuration profile and the measured, normalized simulated or simulated value for each unit cell corresponding to the second cluster for the third configuration profile is used to compile the probability density function.

Figure 10:
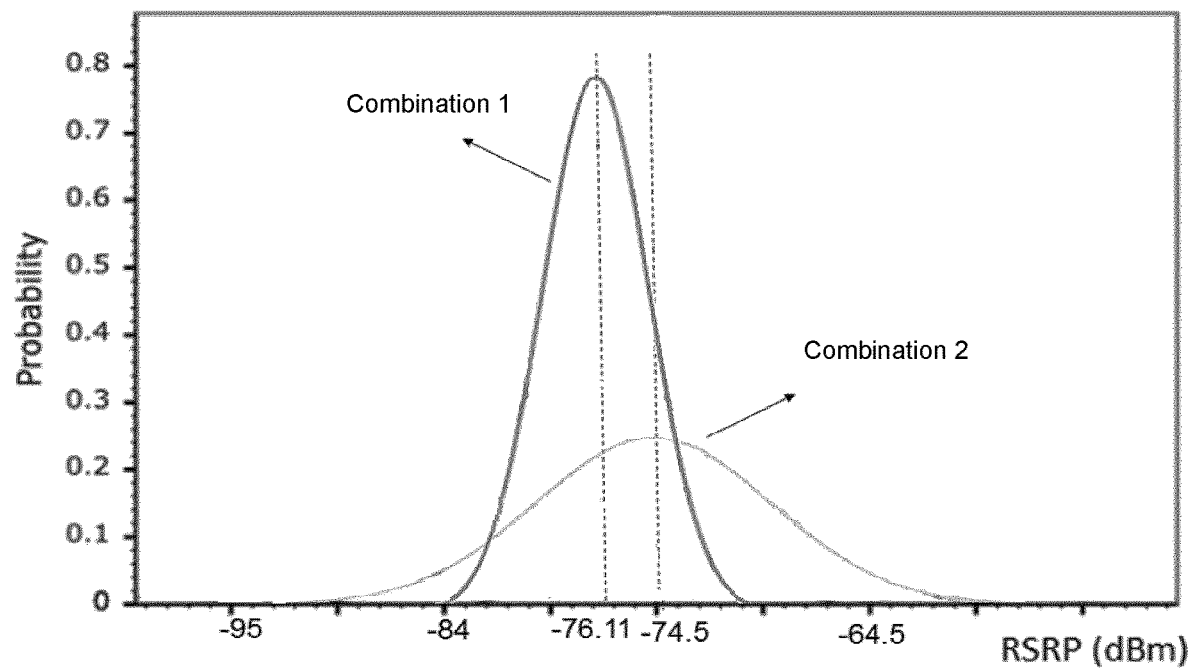
FIG. 10 is a probability distribution function for a first and second combination of configuration profiles.
Figure 11:
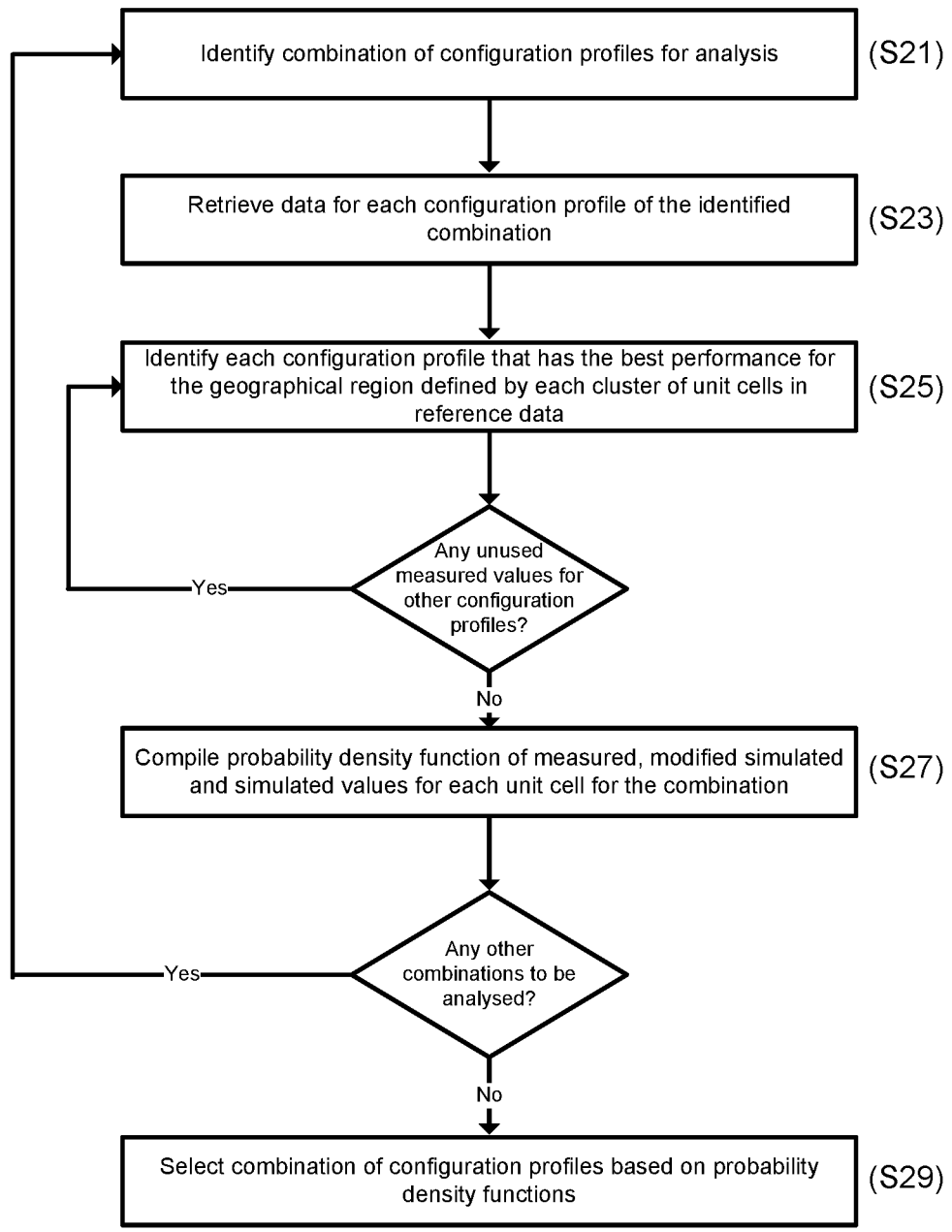
FIG. 11 is a flow diagram illustrating a second sub-process of the embodiment of FIG. 6.

The second sub-process is then repeated for all possible combinations of configuration profiles, resulting in a probability density function of values for each combination. FIG. 10 illustrates an example of two probability density functions for two combinations of configuration profiles. The network operator may then select a combination of configuration profiles by comparing the probability density functions (step S29).

The above embodiment relates to a cellular telecommunications network. However, one of ordinary skill in the art will understand that the present disclosure applies to other forms of wireless telecommunications networks, and even to combinations of wireless telecommunications networks (for example, a cellular network including a base station and a wireless wide area network including a wireless access point, each having a respective set of configuration profiles). One of ordinary skill in the art will also understand that the configuration profile used above is an example, and may cover a broad range of performance parameters that have an impact on performance of wireless telecommunications networks.

The above embodiment was performed on a geographical area within a coverage area of a base station (that is, it was a portion of the coverage area). However, this is non-essential. The geographical area may cover the whole of a base station's coverage area, or may cover the coverage areas (or portions thereof) of a plurality of base stations.

One of ordinary skill in the art will understand that it is non-essential that the computation simulation step (S1) and the FDT steps (steps S3 to S9) are conducted in the order described, so that step S1 may be performed at any point in the process before S11.

In the above embodiment, the simulated values and the FDT were conducted based on the base station utilizing its first transceiver. However, this is non-essential. The simulation and FDTs may be conducted based on a distinct transmitter (e.g. a test antenna) which may be deployed (or simulated).

One of ordinary skill in the art will also understand that the deviation threshold (which defines the extent of the cluster of unit cells around each measured value) may be configured by the network operator. In one implementation, the deviation threshold may be inversely proportional to the count of measured values. Therefore, if the count of measured values is relatively small, then the deviation threshold is relatively large so as to produce a greater number of normalized simulated values (thus compensating for the lack of measured values). Furthermore, the deviation threshold also determines whether a unit cell has a normalized simulated value or a simulated value. The simulated values may or may not be used in the subsequent analysis of the second sub-process.

One of ordinary skill in the art will understand that the benefits of the disclosure may be realized if at least one of the configuration profiles of the combination of configuration profiles includes measured and normalized simulated values, so that the other configuration profiles of the combination may include simulated values only. This may be relevant if the configuration profile is based on a state of the art transmitter that has not yet been deployed, but its characteristics may be simulated.

As noted above, the normalized simulated values may be used to determine the performance of a plurality of transceivers in a wireless telecommunications network for one or more combinations of configuration profiles, and further to identify a combination of configuration profiles that satisfies the operator's requirements. The second embodiment above is an example of how a combination may be identified, but one of ordinary skill in the art will understand that other techniques may be used. Furthermore, it is non-essential that these normalized simulated values are used to identify a combination of configuration profiles, as they may be used to determine the performance of a single configuration profile for a transmitter in a wireless telecommunications network (for example, in a unit cell where there are only simulated values and no measured values of performance). This may be used by the operator in a network planning scenario, such as when reconfiguring one or more transmitters and/or deploying one or more transmitters in a wireless telecommunications network.

One of ordinary skill in the art will understand that any combination of features is possible within the scope of the disclosure, as claimed.

The invention claimed is:

1. A method of determining performance of a Radio Access Network (RAN) of a telecommunications network, the RAN covering an area, and the area being divided into a plurality of unit cells, the method comprising:
   receiving a measured performance value of the RAN within at least one unit cell of the plurality of unit cells;
   receiving a simulated performance value of the RAN within each of the plurality of unit cells;
   identifying a unit cell of the plurality of unit cells that is associated with both a measured performance value and a simulated performance value;
   for the identified unit cell, calculating a difference function between the simulated performance value for the identified unit cell and the measured performance value for the identified unit cell;
   determining that a simulated performance value associated with at least one unit cell that is adjacent to the identified unit cell is within a deviation threshold of the simulated performance value of the identified unit cell;
   applying the difference function to the simulated performance value associated with the at least one unit cell that is adjacent to the identified unit cell to provide a modified simulated performance value for the adjacent unit cell; and
   configuring the RAN based on the modified simulated performance value for the adjacent unit cell.

2. The method according to claim 1, wherein the identifying further comprises identifying each unit cell that is associated with both a measured performance value and a simulated performance value, the calculating further comprises calculating a difference function for each such identified unit cell, and the determining further comprises determining that a simulated performance value associated with at least one unit cell that is adjacent to each such identified unit cell is within the deviation threshold of the simulated performance value of the identified unit cell, the method further comprising:
   applying the difference function to the simulated performance value that is associated with the at least one unit cell that is adjacent to each such identified unit cell to provide a modified simulated performance value for the adjacent unit cell.

3. The method as claimed in claim 2, further comprising:
   determining that a simulated performance value associated with at least one unit cell that is adjacent to the adjacent unit cell is within the deviation threshold of the simulated performance value of the identified unit cell, wherein the difference function is applied to the simulated performance value of the at least one unit cell that is adjacent to the adjacent unit cell to provide a modified simulated performance value for the adjacent unit cell, so as to form a contiguous region of unit cells around each identified unit cell.

4. The method as claimed in claim 3, wherein the method is performed for a plurality of configuration profiles for the RAN to provide a first modified simulated performance value for a first adjacent unit cell for a first configuration profile of the plurality of configuration profiles, and further to provide a second modified simulated performance value for a second adjacent unit cell for a second configuration profile of the plurality of configuration profiles.

5. The method as claimed in claim 4, wherein configuring the RAN is based on the first modified simulated performance value and the second modified simulated performance value.

6. A system comprising:
at least one processor and memory configured to cause a node of a telecommunications network to determine performance of a Radio Access Network (RAN) of the telecommunications network, the RAN covering an area, and the area being divided into a plurality of unit cells, by:
receiving a measured performance value of the RAN within at least one unit cell of the plurality of unit cells;
receiving a simulated performance value of the RAN within each of the plurality of unit cells;
identifying a unit cell of the plurality of unit cells that is associated with both a measured performance value and a simulated performance value;
for the identified unit cell, calculating a difference function between the simulated performance value for the identified unit cell and the measured performance value for the identified unit cell;
determining that a simulated performance value associated with at least one unit cell that is adjacent to the identified unit cell is within a deviation threshold of the simulated performance value of the identified unit cell;
applying the difference function to the simulated performance value associated with the at least one unit cell that is adjacent to the identified unit cell to provide a modified simulated performance value for the adjacent unit cell; and
configuring the RAN based on the modified simulated performance value for the adjacent unit cell.

7. A non-transitory computer readable storage medium storing a computer program comprising instructions which, when the computer program is executed by a processor of a node of a telecommunications network, cause the processor to carry out the method of claim 1.

8. A system for a telecommunications network comprising one or more nodes configured to carry out the method of claim 1.

* * * * *